(12) United States Patent
Odaira et al.

(10) Patent No.: US 10,780,865 B2
(45) Date of Patent: Sep. 22, 2020

(54) ELECTRIC BOOSTER AND STROKE DETECTOR

(71) Applicant: HITACHI AUTOMOTIVE SYSTEMS, LTD., Ibaraki (JP)

(72) Inventors: Atsushi Odaira, Yokohama (JP); Shinji Shimizu, Atsugi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/577,605

(22) PCT Filed: May 18, 2016

(86) PCT No.: PCT/JP2016/064700
§ 371 (c)(1),
(2) Date: Nov. 28, 2017

(87) PCT Pub. No.: WO2016/194611
PCT Pub. Date: Dec. 8, 2016

(65) Prior Publication Data
US 2018/0162330 A1    Jun. 14, 2018

(30) Foreign Application Priority Data

May 29, 2015   (JP) .................................. 2015-110821

(51) Int. Cl.
*B60T 7/04*      (2006.01)
*B60T 8/17*      (2006.01)
(Continued)

(52) U.S. Cl.
CPC .............. *B60T 7/042* (2013.01); *B60T 8/171* (2013.01); *B60T 13/145* (2013.01);
(Continued)

(58) Field of Classification Search
CPC ........ B60T 7/042; B60T 8/171; B60T 13/145; B60T 13/745; B60T 2220/04; G01B 7/00; G01D 5/145
See application file for complete search history.

(56) References Cited

U.S. PATENT DOCUMENTS 3,549,837 A * 12/1970 Barnes .................. B60T 17/226
                                                                200/82 D
4,793,241 A * 12/1988 Mano .................. F15B 15/2861
                                                                92/5 R
(Continued)

FOREIGN PATENT DOCUMENTS

JP    2014-095614    5/2014
JP    2015-021745    2/2015

OTHER PUBLICATIONS

International Search Report dated Jul. 5, 2016 in International Application No. PCT/JP2016/064700.

*Primary Examiner* — Bradley T King
*Assistant Examiner* — James K Hsiao
(74) *Attorney, Agent, or Firm* — Wenderoth, Lind & Ponack, L.L.P.

(57) ABSTRACT

Provided is an electric booster capable of detecting a movement position of an input member in a wide range along an axial direction. The electric booster includes an input rod formed of a magnetic material, an input plunger formed of a non-magnetic material, and an input piston formed of a magnetic material. A stroke detector includes respective magnet members arranged so that magnetic poles are aligned along a movement direction of the input plunger, and a Hall sensor unit that is fixed to a housing, and detects a movement position of the input plunger in accordance with a magnetic flux density from the respective magnet members. As a result, a flat magnetic flux distribution having a wide region along the axial direction is provided, and the (Continued)

movement position of the input plunger can be detected relatively precisely in a wide range along the axial direction.

2 Claims, 8 Drawing Sheets

(51) Int. Cl.
  *B60T 13/74* (2006.01)
  *B60T 8/171* (2006.01)
  *G01B 7/00* (2006.01)
  *B60T 13/14* (2006.01)
  *G01D 5/14* (2006.01)

(52) U.S. Cl.
  CPC .............. *B60T 13/745* (2013.01); *G01B 7/00* (2013.01); *G01D 5/145* (2013.01); *B60T 2220/04* (2013.01); *B60Y 2400/3012* (2013.01)

(56) References Cited

U.S. PATENT DOCUMENTS

| | | | |
|---|---|---|---|
| 4,914,916 A * | 4/1990 | Leigh-Monstevens | B60T 11/20 324/207.2 |
| 5,439,275 A * | 8/1995 | Padula | B60T 15/14 188/158 |
| 6,164,183 A * | 12/2000 | Fulks | B60T 8/4854 91/367 |
| 6,322,165 B1 * | 11/2001 | Klein | B60T 8/3665 303/115.2 |
| 6,464,306 B2 * | 10/2002 | Shaw | B60T 7/042 303/3 |
| 6,670,806 B2 * | 12/2003 | Wendt | G01B 7/003 137/554 |
| 6,732,517 B2 * | 5/2004 | Zehnder, II | B60T 8/38 60/534 |
| 7,423,506 B2 * | 9/2008 | Terasaki | H01F 7/021 335/281 |
| 8,392,085 B2 * | 3/2013 | Schonlau | B60T 8/38 303/122.03 |
| 9,566,964 B2 * | 2/2017 | Jurgens | B60T 7/042 |
| 9,566,972 B2 * | 2/2017 | Voigtmann | B60T 7/042 |
| 9,902,382 B2 * | 2/2018 | Lee | B60T 7/042 |
| 2003/0000375 A1 * | 1/2003 | Zumberge | B60T 8/4081 92/5 R |
| 2004/0020201 A1 * | 2/2004 | Feigel | B60T 7/042 60/534 |
| 2007/0182403 A1 * | 8/2007 | von Hayn | B60T 7/042 324/207.24 |
| 2011/0178687 A1 * | 7/2011 | Anderson | B60T 13/745 701/70 |
| 2013/0086900 A1 * | 4/2013 | Kim | B60T 11/16 60/533 |
| 2014/0298785 A1 * | 10/2014 | Muller | B60T 17/221 60/327 |
| 2016/0169705 A1 * | 6/2016 | Yamashita | B60T 7/042 324/207.25 |
| 2016/0264114 A1 * | 9/2016 | Maruo | B60T 11/18 |
| 2017/0261344 A1 * | 9/2017 | Guibet | G01D 5/145 |

* cited by examiner

FIG. 10 ic booster including: a housing configured to accommodate an assist mechanism for propelling a piston of a master cylinder through an operation of an electric motor; an input member, which includes a distal end side arranged in the housing and a base end side coupled to a brake pedal, and is configured to move in an axial direction in accordance with an operation of the brake pedal; and a stroke detector configured to detect a movement position of the input member. The input member includes: an input rod including a base end side coupled to the brake pedal; a magnet holding member including a base end side positioned on the distal end side of the input rod; and an input piston including a base end side positioned on a distal end side of the magnet holding member. At least one of the input rod or the input piston is formed of a magnetic material. The stroke detector includes: a magnet member which is fixed to the magnet holding member and is arranged so that magnetic poles are aligned along a movement direction of the input member; and magnetic flux density detection unit fixed to the housing and configured to detect the movement position of the input member in accordance with a magnetic flux density from the magnet member.

ELECTRIC BOOSTER AND STROKE DETECTOR

TECHNICAL FIELD

The present invention relates to an electric booster, which is configured to generate a brake hydraulic pressure in a master cylinder through detection of an operation amount of a pedal of a vehicle such as an automobile, and to a stroke detector, which is configured to detect a pedal stroke caused by a pedal operation.

BACKGROUND ART

As a technology relating to an electric booster and a stroke detector, in Patent Literature 1, for example, there is disclosed a vehicle brake device including a braking assist device and a stroke detector. The braking assist device boosts a stepping force on a brake pedal through drive of a motor. The stroke detector detects a movement position of an input rod based on an operation amount of the brake pedal. In this vehicle brake device, a hydraulic pressure of brake fluid is supplied to wheel cylinders by the braking assist device through a hydraulic pressure control unit based on the operation amount of the brake pedal detected by the stroke detector.

CITATION LIST

Patent Literature

PTL 1: JP 2015-21745 A

SUMMARY OF INVENTION

Technical Problem

The stroke detector employed in the vehicle brake device disclosed in Patent Literature 1 detects a magnetic flux density of a plurality of magnetic bodies mounted to the input rod along an axial direction of the input rod through a Hall sensor unit provided on a cover of a casing, to thereby detect a stroke amount (movement position) of the input rod. This stroke detector detects the maximum stroke amount of the input rod by increasing a magnetic field in accordance with distances among the respective magnetic bodies and sizes of the respective magnetic bodies.

However, an aspect ratio of the magnetic field of the magnetic bodies (magnet members) is approximately constant, and when components formed of magnetic materials are arranged on a radially outside of the respective magnetic bodies, the magnetic field is affected by the respective components, and a magnetic flux distribution of each of the magnetic bodies swells out in the radial direction. Therefore, the stroke amount of the input member cannot be detected in a wide range along the axial direction.

The present invention has been made in view of the above-mentioned circumstance, and has an object to provide an electric booster and a stroke detector, which are capable of detecting a movement position of an input member (movement member) in a wide range along an axial direction.

Solution to Problem

As a measure for achieving the above-mentioned object, according to the present invention, there is provided an Further, according to the present invention, there is provided a stroke detector configured to detect a movement position of a movement member. The movement member including: a first member configured to linearly move; and a second member and a third member which are positioned on both end sides of the first member along a movement direction of the first member. At least one of the second member or the third member is formed of a magnetic material. The stroke detector includes: a magnet member provided in the first member and arranged so that magnetic poles are aligned in a movement direction of the movement member; and magnetic flux density detection unit configured to detect the movement position of the movement member in accordance with a magnetic flux density from the magnet member.

Advantageous Effects of Invention

With the electric booster and the stroke detector according to the present invention, it is possible to detect the movement position of the input member (movement member) in a wide range along the axial direction.

DESCRIPTION OF EMBODIMENTS

Now, with reference to FIG. 1 to FIG. 10, an embodiment of the present invention is described in detail.

Figure 1:
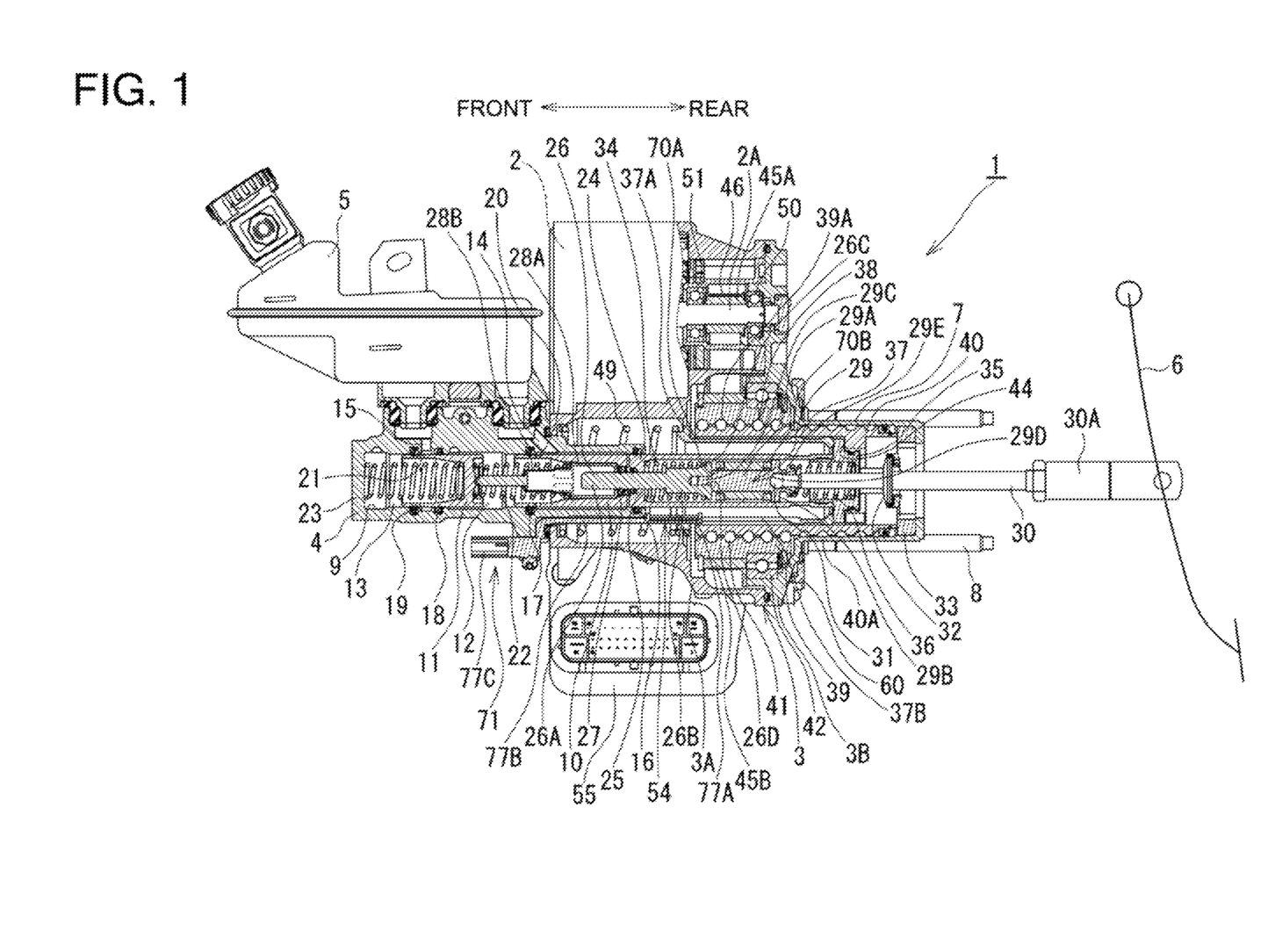
FIG. 1 is a sectional view for illustrating an electric booster according to an embodiment of the present invention.
Figure 2:
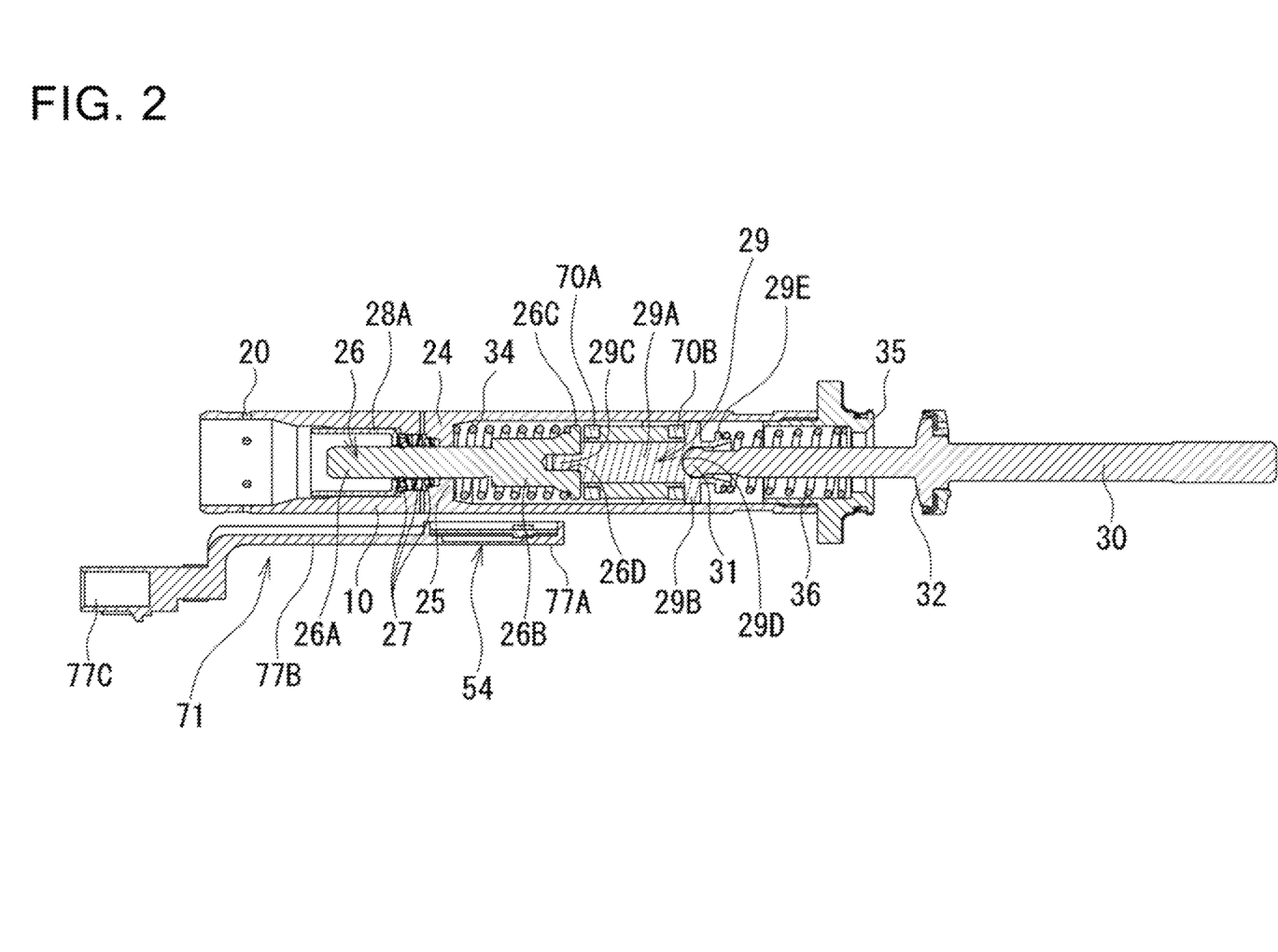
FIG. 2 is an enlarged view for illustrating main parts of the electric booster of FIG. 1.
Figure 3:
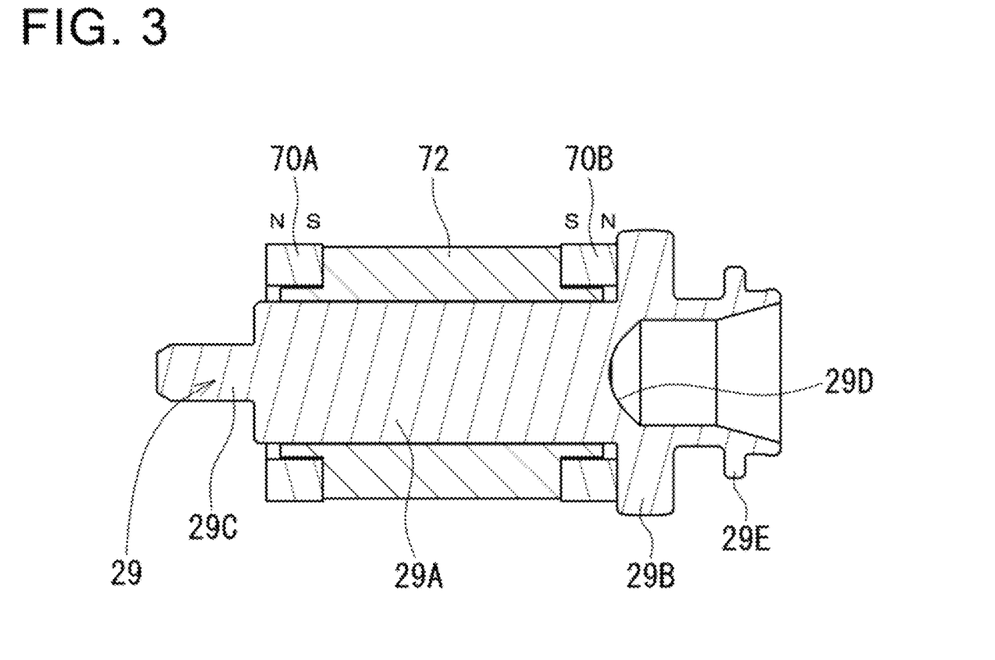
FIG. 3 is a view for illustrating arrangement and polarities of a first magnet member and a second magnet member, which are mounted to an input plunger.

An electric booster 1 according to this embodiment is employed in a vehicle brake device for an electric vehicle, a hybrid electric vehicle, and the like. As illustrated in FIG. 1, the electric booster 1 mainly includes a housing 3, an input rod 30, an input plunger 29, an input piston 26, and a stroke detector 54. A ball screw mechanism 38, which is an assist mechanism for propelling a primary piston 10 and a secondary piston 11 of a master cylinder 4 through an operation of the electric motor 2, is accommodated in the housing 3. A distal end side of the input rod 30 is arranged in the housing 3, and a base end side thereof is coupled to a brake pedal 6. The input rod 30 is moved in an axial direction in the housing 3 in accordance with an operation of the brake pedal 6, to thereby construct an input member together with the input plunger 29 and the input piston 26. The stroke detector 54 is configured to detect a stroke amount (movement position) of the input rod 30, the input plunger 29, and the input piston 26. In the following description, a left side of the drawings is defined as a front side (vehicle front side), and a right side of the drawings is defined as a rear side (vehicle rear side).

As illustrated in FIG. 1, the electric booster 1 has such a structure that a tandem type master cylinder 4 is coupled to a front side of the housing 3 (left side of FIG. 1). A reservoir 5 configured to supply brake fluid to the master cylinder 4 is mounted to an upper part of the master cylinder 4. The housing 3 includes a front housing 3A for accommodating the electric motor 2, the ball screw mechanism 38, and the like, and a rear housing 3B for closing a rear end opening (right end opening of FIG. 1) of the front housing 3A. A cylinder part is provided on the rear housing 3B concentrically with the master cylinder 4 to protrude toward the rear of the housing 3, namely in a direction departing from the master cylinder 4. A mounting plate 60 is fixed to a periphery of the cylinder part 7 of the rear housing 3B. A plurality of stud bolts 8 are mounted to the mounting plate 60. Then, the electric, booster 1 is arranged in an engine room while the input rod 30 is protruded from a dash panel (not shown), which is a bulkhead between the engine room and a cabin of the vehicle, so as to be exposed in the cabin. The electric booster 1 is fixed to the dash panel through the plurality of stud bolts 8.

A cylinder bore 9 including a bottom is formed in the master cylinder 4. A primary piston 10 is arranged on an opening part side of the cylinder bore 9. This primary piston 10 is formed of a non-magnetic material. The primary piston 10 is formed of, for example, aluminum alloy. The primary piston 10 is entirely formed into a generally cylindrical shape, and an intermediate wall 24 is provided at a center inner portion in the axial direction. A guide bore 25 passes through the intermediate wall 24 in the axial direction. A front end side in a cup shape of this primary piston 10 is arranged in the cylinder bore 9. Moreover, the secondary piston 11 in a cup shape is arranged on a bottom part side of the cylinder bore 9. The secondary piston 11 is thrilled of a non-magnetic material. The secondary piston 11 is formed of, for example, aluminum alloy. A rear end part of the primary piston 10 extends from the opening part of the master cylinder 4 through an inside of the housing 3 to an inside of the cylinder part 7 of the rear housing 3B. In the cylinder bore 9 of the master cylinder 4, a primary chamber 12 is formed between the primary piston 10 and the secondary piston 11, and a secondary chamber 13 is formed between the bottom part of the cylinder bore 9 and the secondary piston 11.

The primary chamber 12 and the secondary chamber 13 of the master cylinder 4 respectively communicate with wheel cylinders (not shown) of respective wheels, and are configured to transmit a hydraulic pressure of the brake fluid generated by the master cylinder 4 to the wheel cylinders of the respective wheels to generate a braking force for acting on rotations of the respective wheels, thereby generating a braking force fir the vehicle.

Moreover, as illustrated in FIG. 1, reservoir ports 14 and 15 for respectively connecting the primary chamber 12 and the secondary chamber 13 to the reservoir 5 are provided in the master cylinder 4. Piston seals 16, 17, 18, and 19 in annular shapes, which are brought into abutment against the primary piston 10 and the secondary piston 11 so as to partition the inside of the cylinder bore 9 into the primary chamber 12 and the secondary chamber 13, are arranged at predetermined intervals along the axial direction on an inner peripheral surface of the cylinder bore 9. The piston seals 16 and 17 are arranged on both sides of the one reservoir port 14 (rear side) along the axial direction. When the primary piston 10 is at a non-braking position illustrated in FIG. 1, the primary chamber 12 communicates with the reservoir port 14 through a piston port 20 provided on a side wall of the primary piston 10. Then, when the primary piston 10 moves forward from the non-braking position so that the piston port 20 reaches the one piston seal 17, the primary chamber 12 is blocked by the piston seal 17 from the reservoir port 14, resulting in the generation of the hydraulic pressure.

Similarly, the remaining two piston seals 18 and 19 are arranged on both sides of the reservoir port 15 (front side) along the axial direction. When the secondary piston 11 is at the non-braking position illustrated in FIG. 1, the secondary chamber 13 communicates with the reservoir port 15 through a piston port 21 provided on a side wall of the secondary piston 11. Then, the secondary piston 11 moves forward from the non-braking position, and the secondary chamber 13 is blocked by the piston seal 19 from the reservoir port 15, resulting in the generation of the hydraulic pressure.

A spring 22 is interposed between the primary piston 10 and the secondary piston 11. Moreover, a spring 23 is interposed between the bottom part of the cylinder bore 9 and the secondary piston 11. A spacer 28A in a cylindrical shape and a retainer 28B capable of contracting/extending are arranged on a front side of the intermediate wall 24 inside the primary piston 10. The retainer 28B is configured to restrict the maximum length of the spring 22. The input piston 26 is slidably and fluid-tightly inserted into the guide bore 25 formed in the intermediate wall 24 of the primary piston 10. The input piston 26 is formed of a magnetic material. The input piston 26 is formed of a steel material such as sulfur composite tree cutting steel. The input piston 26 constructs a second or third member of a movement member of this embodiment. The input piston 26 is formed into a step shape including a smaller diameter part 26A positioned on the front side and a larger diameter part 26B continuously extending from the smaller diameter part 26A toward the rear side. The smaller diameter part 26A of the input piston 26 is slidably and fluid-tightly inserted into the guide bore 25.

A gap between an outer peripheral surface of the smaller diameter part 26A of the input piston 26 and an inner peripheral surface of the guide bore 25 of the intermediate wall 24 of the primary piston 10 is sealed by a plurality of seal members 27. A spring seat part 26C in an outer flange shape is thrilled on a rear end of the larger diameter part 26B of the input piston 26. A guide recessed part 26D is formed on a rear end surface of the input piston 26. A front end part of the smaller diameter part 26A of the input piston 26 faces the primary chamber 12 of the master cylinder 4, and the input piston 26 is movable along the axial direction relatively to the primary piston 10.

The input plunger 29 is guided so as to be movable along the axial direction in the rear of the input piston 26 inside the rear side of the primary piston 10. In this embodiment, the input plunger 29 is formed of a non-magnetic material. The input plunger 29 is formed of, for example, aluminum alloy. The input plunger 29 constructs a magnet holding member of the input member of this embodiment, and constructs a first member of the moving member. Also with reference to FIG. 2 to FIG. 5, the input plunger 29 is constructed integrally by a shaft part 29A, an annular part 29B, a smaller diameter protruded part 29C, a spherical recessed part 29D, and a spring seat part 29E. The annular part 29B is provided to protrude radially outward on a rear end of the shaft part 29A in the axial direction. The smaller diameter protruded part 29C is provided to protrude forward from a front end surface of the shaft part 29A. The spherical recessed part 29D is provided on a rear end surface of the shaft part 29A. The spring seat part 29E is provided to protrude backward from a periphery of the spherical recessed pan 29D. A ball joint 31 of a front end part of the input rod 30 is coupled to the spherical recessed part 29D of the input plunger 29, thereby permitting an inclination of the input rod 30 with respect to the axial direction to some extent. The smaller diameter protruded part 29C of the input plunger 29 is arranged in the guide recessed part 26D provided on the rear end surface of the input piston 26. An outer wall surface of the annular part 29B of the input plunger 29 is brought into abutment against an inner wall surface of the primary piston 10. The input plunger 29 does not always need to be formed of a non-magnetic material.

A front end side of the input rod 30, which is coupled to the input plunger 29, is arranged inside the cylinder part 7 of the rear housing 3B and the rear side of the primary piston 10, and a rear end side of the input rod 30 extends to the outside from the cylinder part 7. The input rod 30 is formed of a magnetic material the input rod 30 is formed of a steel material such as carbon steel. The input rod 30 constructs the second or third member of the movement member of this embodiment. On a front end part of the input rod 30, the ball joint 31 coupled to the spherical recessed part 29D of the input plunger 29 is provided. The brake pedal 6 is coupled to a rear end part of the input rod 30 through intermediation of a clevis 30A. The input rod 30 is moved in the axial direction by the operation of the brake pedal 6, and the input plunger 29 and the input piston 26 are moved in the axial direction in association with the input rod 30. Moreover, a stopper abutment part 32 in a flange shape is formed in a portion approximately at the center of the input rod 30. A stopper 33 extending radially inward is formed on a rear end part of the cylinder part 7, and a backward movement position of the input rod 30 is defined through abutment of the stopper abutment part 32 of the input rod 30 against the stopper 33.

The stroke detector 54 is configured to detect a stroke amount (movement position) of the input plunger 29 and the input piston 26 reciprocating along the axial direction in association with the input rod 30, as an operation amount (stroke amount) of the brake pedal 6. Also with reference to FIG. 2 to FIG. 5, the stroke detector 54 includes a plurality of magnet members 70A and 70B and a Hall sensor unit 71. The plurality of magnet members 70A and 70B are fixed to the input plunger 29, and are arranged so that magnetic poles are aligned along the movement direction of the input plunger 29. The Hall sensor unit 71 is fixed to the housing 3, and is configured to output a signal indicating the movement position of the input member (movement member) including the input plunger 29, the input rod 30, and the input piston 26 in accordance with a magnetic flux density generated by the respective magnet members 70A and 70B. The Hall sensor unit 71 constructs magnetic flux density detection unit of this embodiment.

The plurality of the magnet members, namely, the first and second magnet members 70A and 70B, are formed into a ring shape. The first and second magnet members 70A and 70B are formed so as to be the same in an outer diameter, an inner diameter, and a thickness. The two of the first and second magnet members 70A and 70B are provided in this embodiment, but the number of the magnet members may be one or three or more. Moreover, both of the first and second magnet members 70A and 70B are formed so as to be the same in the size in this embodiment, but do not necessarily be formed to be the same in the size. A cylindrical support body 72 for supporting the first and second magnet members 70A and 70B is mounted to the shaft part 29A of the input plunger 29. The cylindrical support body 72 is formed of a non-magnetic material. This cylindrical support body 72 is formed of, for example, synthetic resin. An outer diameter of the cylindrical support body 72 is smaller than an outer diameter of the annular prat 29B of the input plunger 29, and is approximately the same as outer diameters of the first and second magnet members 70A and 70B. A length of the cylindrical support body 72 is slightly smaller than the shaft part 29A of the input plunger 29. Cutout parts 72A and 72A extending in a circumferential direction are formed on an outer peripheral surface on both ends of the cylindrical support body 72. Lengths of the respective cutout parts 72A in the axial direction are slightly smaller than thicknesses (lengths in the axial direction) of the first and second magnet members 70A and 70B.

Then, the first and second magnet members 70A and 70B are respectively mounted to the cutout parts 72A and 72A formed in the outer peripheral surface on the both ends of the cylindrical support body 72. Subsequently, the cylindrical support body 72 including the first and second magnet members 70A and 70B are mounted to the shaft part 29A of the input plunger 29. At this time, the second magnet member 70B is in contact with the annular part 29B of the input plunger 29, but an end surface of the cylindrical support body 72 on the second magnet member 70B side is not in contact with the annular part 29B, and a gap is thus provided. The second magnet member 70B may not be in contact with the annular part 29B of the input plunger 29, and may be arranged to be separated from the annular part 29B with a gap.

According to this embodiment, the gap between the first magnet member 70A and the second magnet member 70B is set to be smaller than the maximum stroke amount (movement amount) of the input plunger 29 (input rod 30). The first magnet member 70A is arranged on a master cylinder 4 side (front side), and the second magnet member 70B is arranged on a brake pedal 6 side (rear side). The magnetic poles of the first and second magnet members 70A and 70B are arranged so that the N pole and the S pole are separately provided, and anisotropy is thus formed along the axial direction of the input plunger 29. Specifically, in the case of the first magnet member 70A, the N pole is arranged on the master cylinder 4 side (front side), and the S pole is arranged on the brake pedal 6 side (rear side). Meanwhile, in the case of the second magnet member 70B, the S pole is arranged on the master cylinder 4 side (front side), and the N pole is arranged on the brake pedal 6 side (rear side). The arrangement of the magnetic poles of the first magnet member 70A and the second magnet member 70B may be reversed from the above-mentioned arrangement.

Figure 4:
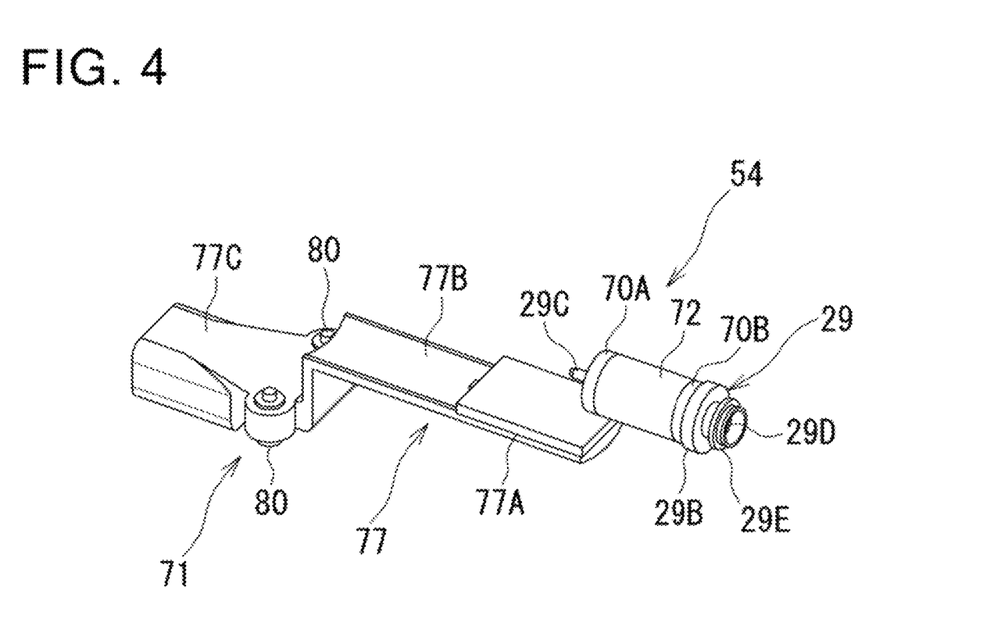
FIG. 4 is a perspective view for illustrating a stroke detection device employed in the electric booster of FIG. 1.
Figure 5:
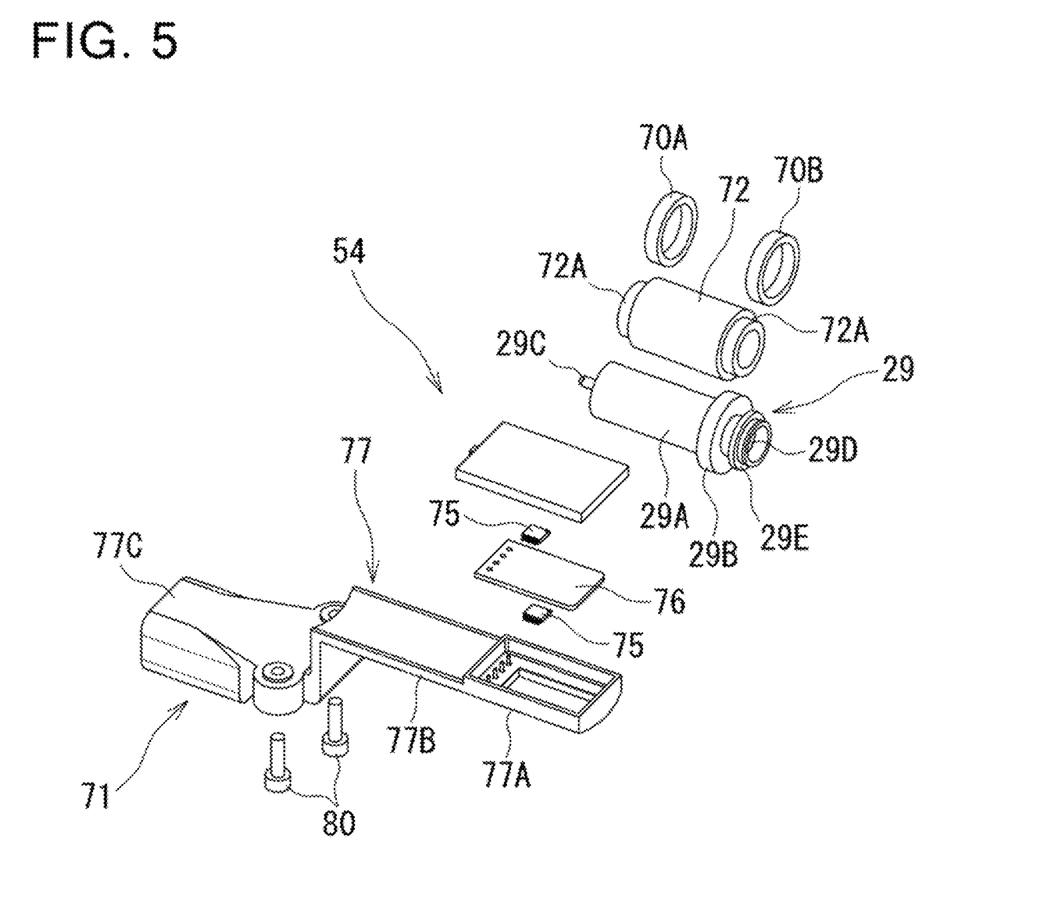
FIG. 5 is an exploded perspective view for illustrating the stroke detector of FIG. 4.

As illustrated in FIG. 4 and FIG. 5, the Hall sensor unit 71 includes two Hall IC chips 75 and 75 for detecting the magnetic flux, an electronic substrate 76 on which the respective Hall IC chips 75 and 75 are mounted, and a casing 77 that holds the electronic substrate 76 and includes a connector part 77C. The two Hall IC chips 75 and 75 are respectively mounted on a front surface and a rear surface of the electronic substrate 76. In the casing 77, a casing part 77A, a plate-shape support part 77B, and a connector part 77C are integrally formed of synthetic resin. The casing part 77A is configured to accommodate the electronic substrate 76 including the respective Hall IC chips 75 and 75, and has an approximately rectangular solid shape. The plate-shape support part 77B is formed so as to extend from the casing part 77A to the master cylinder 4 side (front side). The connector part 77C is formed so as to protrude from a front end of the plate-shape support part 77B toward the outside of the housing 3, then bend toward the master cylinder 4 side (front side), and further extend in the axial direction.

The Hall sensor unit 71 is arranged at a position separated by a predetermined distance in a direction orthogonal to a center axis of the input plunger 29 (radial direction). The Hall sensor unit 71 is fixed at its end part by a plurality of fixing bolts 80, together with the master cylinder 4. Specifically, also with reference to FIG. 1, the casing part 77A in the casing 77 of the Hall sensor unit 71 is arranged along the axial direction at a position extending backwards from a rear end of the master cylinder 4 to a cutout part 37B formed in a peripheral wall of the cylindrical member 37 described later. The plate-shape support part 77B in the casing 77 of the Hall sensor unit 71 is arranged so as to align with the axial direction between the outer peripheral surface of the master cylinder 4 and a return spring 49. Further, the connector part 77C in the casing 77 of the Hall sensor unit 71 extends along the axial direction on a side of the master cylinder 4, and is arranged so as to be exposed to the outside of the housing 3. Moreover, according to this embodiment, when the Hall sensor unit 71 is at the non-braking position illustrated in FIG. 1, the rear end of the casing part 77A of the Hall sensor unit 71 is arranged so as to overlap, in the radial direction, a nut member 39 and a front end of a threaded shaft 40 of the ball screw mechanism 38 described later. However, the Hall sensor unit 71 does not always need to be arranged so that the rear end of the casing part 77A overlaps the nut member 39 and the front end of the threaded shaft 40 in the radial direction.

Figure 6:
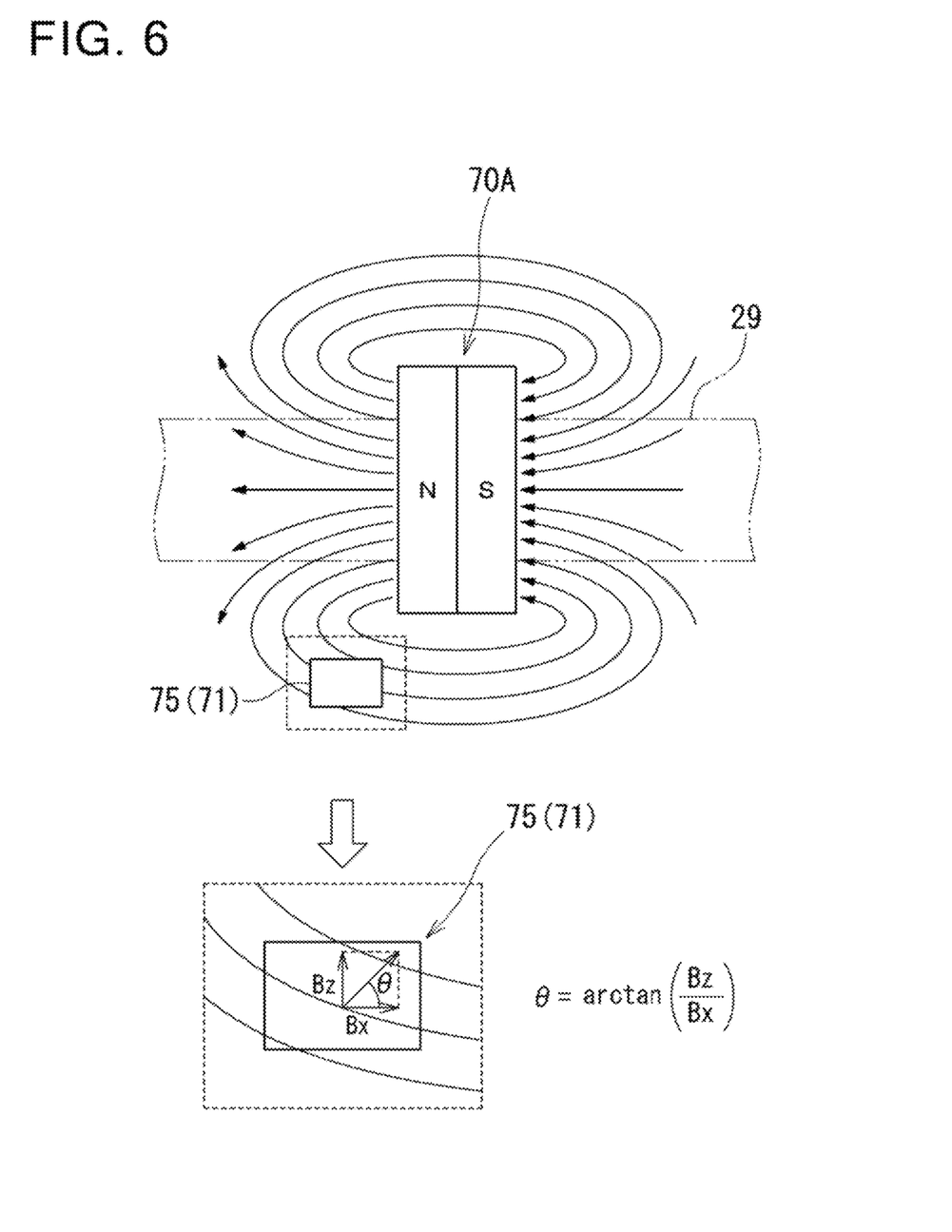
FIG. 6 is an explanatory view for illustrating a method of detecting a magnetic flux density from the first magnet member through a Hall IC chip.

FIG. 6 is a view for illustrating a method of detecting the magnetic flux density by the Hall IC chip 75. The two Hall IC chips 75 and 75 have the same configurations, and description is thus given only of the configuration of the one Hall IC chip 75.

For example, magnetic flux lines (sum of magnetic flux lines in the X direction and magnetic flux lines in the Z direction) from the first magnet member 70A extend along the axial direction of the input plunger 29 from the N pole on the front side in the axial direction, and turn around to the S pole side. The Hall element of the Hall IC chip 75 is capable of detecting a magnetic flux density $Bx$ on an X direction plane parallel to the center axis of the input plunger 29 and a magnetic flux density $Bz$ on a Z direction plane in a direction orthogonal to the center axis (radial direction), of a magnetic flux density as the number of the magnetic flux lines per unit area perpendicular to the magnetic field. As a result, a vector angle $\theta$ of the magnetic flux density is calculated from the detected magnetic flux densities ($Bx$, $Bz$) in the two directions. This vector angle $\theta$ of the magnetic flux density is calculated as $\theta=\arctan(Bz/Bx)$. The movement position of the input plunger 29 along the axial direction can be calculated from this vector angle $\theta$ of the magnetic flux density.

Figure 7:
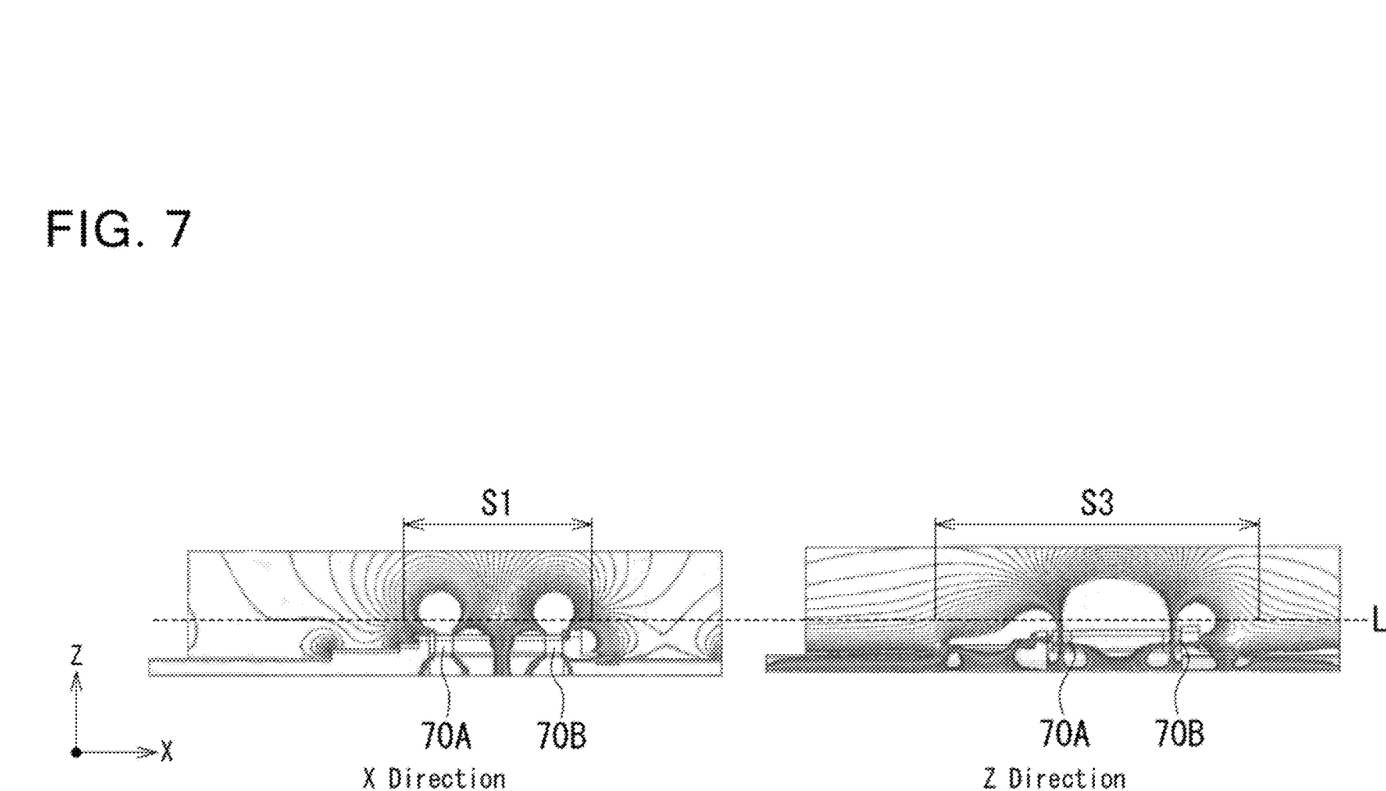
FIG. 7 is a view for illustrating magnetic flux distributions in an X direction and a Z direction from the first and second magnet members in a form in which an input rod and an input piston are formed of magnetic materials.

In FIG. 7, magnetic flux distributions in the X direction and the Z direction from the first and second magnet members 70A and 70B, which are detected by the Hall sensor unit 71 (Hall IC chip 75), are illustrated. When the first and second magnet members 70A and 70B having those magnetic flux distributions translate together with the input plunger 29 on the axis thereof, the Hall sensor unit 71 (Hall IC chip 75) detects the magnetic flux density $Bx$ in the X direction and the magnetic flux density $Bz$ in the Z direction, and uses the vector angle $\theta$ of the magnetic flux density to calculate the movement position along the axial direction of the input plunger 29. A dotted line L of FIG. 7 and FIG. 8 represents respective relative movement positions of the Hall IC chip 75 of the Hall sensor unit 71 with respect to the input plunger 29.

Figure 8:
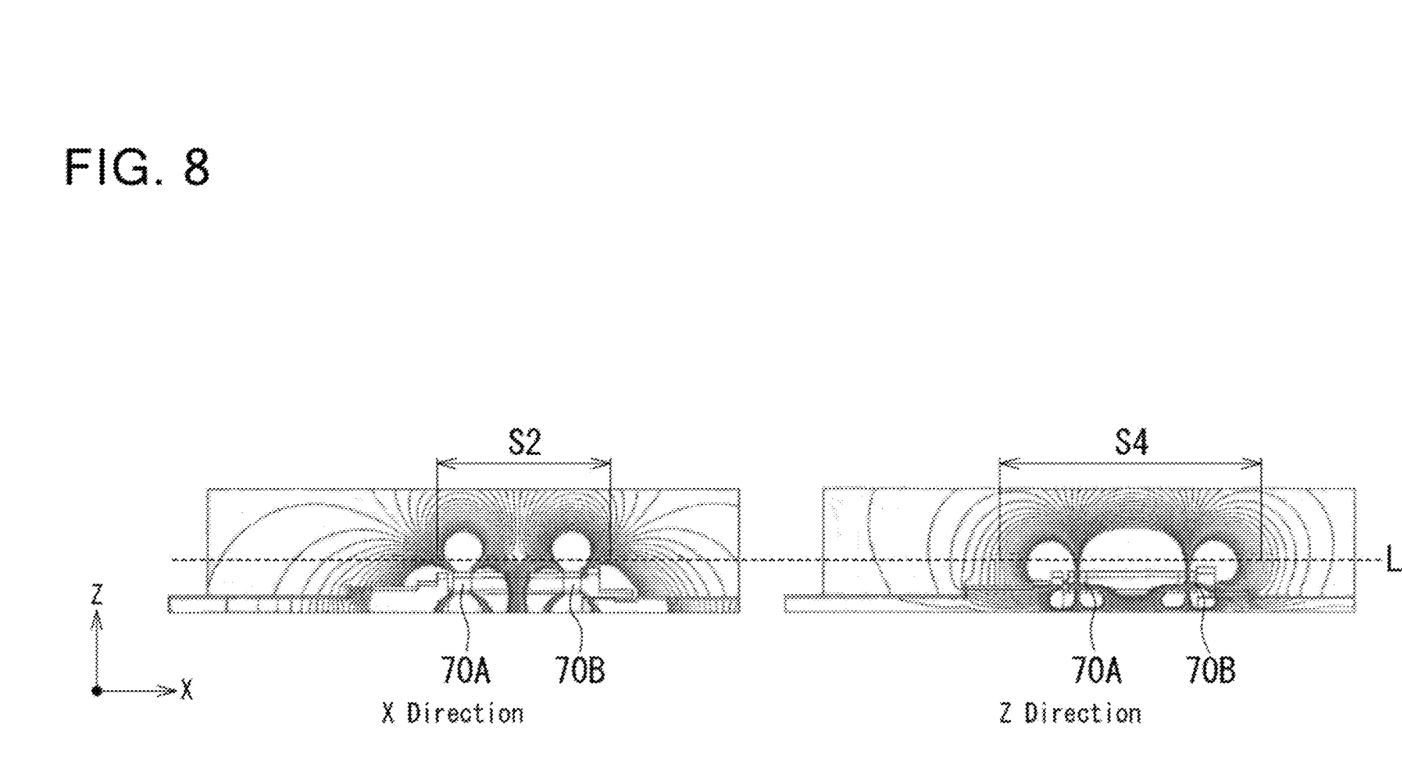
FIG. 8 is a view for illustrating the magnetic flux distributions in the X direction and the Z direction from the first and second magnet members in a form in which the input rod and the input piston are formed of non-magnetic materials.

FIG. 8 is a view for illustrating the magnetic flux distributions in the X direction and the Z direction from the first and second magnet members 70A and 70B in a form in which the input rod 30 and the input piston 26 are formed of non-magnetic materials. The magnetic flux distributions of this embodiment illustrated in FIG. 7 and the magnetic flux distributions illustrated in FIG. 8 are compared with each other. Regarding the magnetic flux distributions in the X direction, a distance S1 illustrated in FIG. 7 between intersections between a certain magnetic flux line and the dotted line L is larger than a distance S2 illustrated in FIG. 8 between intersections between a magnetic flux line having the same value as that of the magnetic flux line employed in FIG. 7 and the dotted line L. Meanwhile, also regarding the magnetic flux distributions in the Z direction, a distance S3 illustrated in FIG. 7 between intersections between a certain magnetic flux line and the dotted line L is larger than a distance S4 illustrated in FIG. 8 between intersections between a magnetic flux line having the same value as that of the magnetic flux line employed in FIG. 7 and the dotted line L. This is caused by generation of the magnetic field between the first and second magnet members 70A and 70B, and the input rod 30 and the input piston 26 formed of the magnetic materials. Then, a magnetic flux distribution, which is a sum of the magnetic flux lines in the X direction and the Z direction from the first and second magnet members 70A and 70B, is a flatter distribution having a larger region along the axial direction than conventional art.

Figure 9:
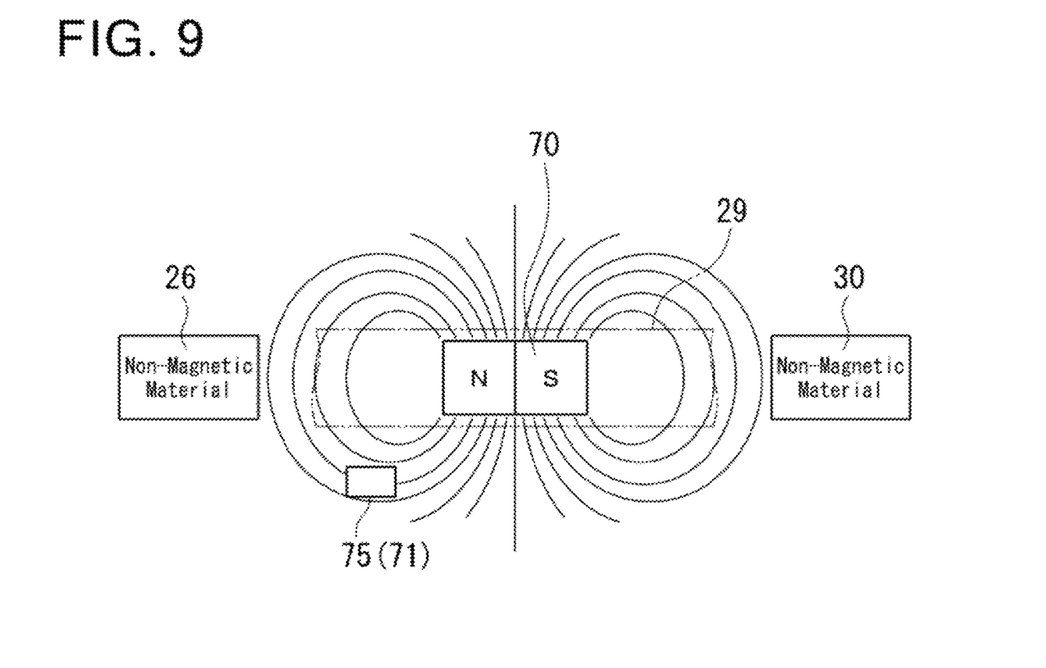
FIG. 9 is a view for illustrating the magnetic flux distribution in the Z direction from a magnet member in a form in which the number of the magnet members is one and the input rod and the input piston are formed of non-magnetic materials.
Figure 10:
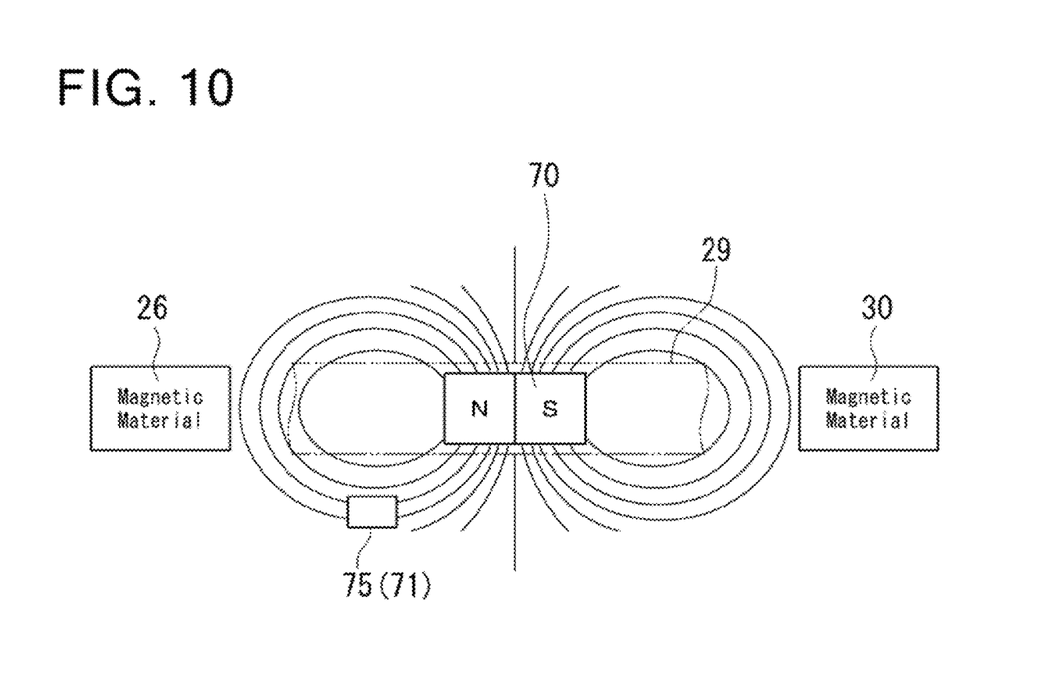
FIG. 10 is a view for illustrating the magnetic flux distribution in the Z direction from the magnet member in a form in which the number of the magnet members is one and the input rod and the input piston are formed of magnetic materials.

Moreover, FIG. 9 is a view for illustrating a magnetic flux distribution in the Z direction from a magnet member 70 in a form in which the one magnet member 70 is provided for the input plunger 29, and the input rod 30 and the input piston 26 are formed of non-magnetic materials. Meanwhile, FIG. 10 is a view for illustrating a magnetic flux distribution in the Z direction from the magnet member 70 in a form in which the one magnet member 70 is provided for the input plunger 29, and the input rod 30 and the input piston 26 are formed of magnetic materials. The magnetic flux distribution illustrated in FIG. 10 is a flatter distribution having a larger region along the axial direction than the magnetic flux distribution illustrated in FIG. 9. In other words, both in the form in which the one magnet member 70 is provided for the input plunger 29, and in the form in which two or more magnet members 70 are provided, the magnetic flux distribution from the magnet members 70 is a flat distribution having a large region along the axial direction.

Moreover, as illustrated in FIG. 1, a first spring 34, which is a compression coil spring, is interposed between the intermediate wall 24 of the primary piston 10 and the spring seat part 26C formed on the rear end part of the input piston 26. Moreover, a second spring 36, which is a compression coil spring, is interposed between the spring seat part 29E provided on the rear end part of the input plunger 29 and the spring seat 35 mounted to the rear end part of the primary piston 10. Moreover, the cylindrical member 37 is arranged in the tubular threaded shaft 40, which is a component of the ball screw mechanism 38 described later. A rear end part of this cylindrical member 37 is in contact with a front surface of an outer peripheral part of the spring seat 35, and the cylindrical member 37 extends to a position slightly forward of a front end of the threaded shaft 40. A spring seat 37A is formed on a front end surface of the cylindrical member 37. The cutout part 37B extending in the axial direction from an opening end is formed in the portion on the peripheral wall of the cylindrical member 37 in which the casing part 77A of the Hall sensor unit 71 is arranged. The cylindrical member 37 is formed of a non-magnetic material. The cylindrical member 37 is formed synthetic resin such as polyester-based thermoplastic engineering plastic.

The input piston 26 and the input plunger 29 are held at an initial position illustrated in FIG. 1 with respect to the primary piston 10 by the first spring 34 and the second spring 36 when the brake pedal 6 is in a non-operation state. In other words, the input piston 26 and the input plunger 29 are elastically held with respect to the primary piston 10 at a position where a biasing force of the first spring 34 and a biasing force of the second spring 36 balance with each other. The input piston 26 and the input plunger 29 are movable forward and backward with respect to the primary piston 10 from this initial position.

The ball screw mechanism 38, which is a rotation/translation conversion mechanism and serves as the assist mechanism, is accommodated in the housing 3. The ball screw mechanism 38 is driven by the electric motor 2 arranged in the housing 3, converts a rotational motion to a translational motion, and provides a propulsion force to the primary piston 10. The ball screw mechanism 38 includes the nut member 39 and the threaded shaft 40. Those nut member 39 and threaded shaft 40 are formed of magnetic materials. The nut member 39 and the threaded shaft 40 are each formed of a steel material such as chromium molybdenum steel or carbon steel. The nut member 39 is rotatably supported in the housing 3 by a bearing member 42. This bearing member 42 is fixed to the rear housing 3B.

The threaded shaft 40 is formed into a tubular shape. The threaded shaft 40 extends from the inside of the nut member 39 to the inside of the cylinder part 7 of the housing 3, and is supported by the housing 3 so as to be movable along the axial direction and so as not to rotate about an axis. This threaded shaft 40 is biased in a backward movement direction by a biasing force of the return spring 49, which is a compression coil spring interposed between the bottom part of the front housing 3A and the spring seat 37A provided at the front end of the cylindrical member 37. Spiral grooves 39A and 40A are formed respectively in an inner peripheral surface of the nut member 39 and an outer peripheral surface of the threaded shaft 40. Balls 41, which are a plurality of rolling elements, are loaded together with grease between those spiral grooves 39A and 40A. The threaded shaft 40 is guided by the stopper 33 of the cylinder part 7 so as to be movable along the axial direction, and is supported so as not to rotate about the axis. As a result, as the nut member 39 rotates, the balls 41 roll along the spiral grooves 39A and 40A, and the threaded shaft 40 thus moves in the axial direction. The ball screw mechanism 38 is capable of converting the rotational motion and the translational motion to each other between the nut member 39 and the threaded shaft 40.

The rear end part of the primary piston 10 is inserted into the threaded shaft 40, and a rear surface of the outer peripheral part of the spring seat 35 is brought into abutment against a step part 44 constructed by a plurality of protruded parts formed on an inner peripheral part of the threaded shaft 40, thereby defining a backward movement position with respect to the threaded shaft 40. As a result of the abutment against the step part 44, the primary piston 10 is moved forward by being pressed by the step part 44, together with the cylindrical member 37 as the threaded shaft 40 moves forward. Moreover, as the input rod 30, the input piston 26, and the input plunger 29 move forward, the primary piston 10 is capable of departing from the step part 44, and of independently moving forward even in a state where the threaded shaft 40 does not move forward.

The electric motor 2 is not coaxial with the master cylinder 4, the input rod 30, and the ball screw mechanism 38, and is accommodated in the housing 3. A pulley 45A is mounted to an output shaft 2A of the electric motor 2. The output shaft 2A is rotationally supported by bearing members 50 and 51 in the housing 3. A pulley 45B is also mounted to the nut member 39 of the ball screw mechanism 38. A belt 46 is wound on the pulley 45A of the output shaft 2A and the pulley 45B of the nut member 39. Then, the electric motor 2 is configured to turn the nut member 39 of the ball screw mechanism 38 through intermediation of the pulleys 45A and 45B and the belt 46.

Moreover, in this electric booster 1, a microprocessor-based controller 55 for controlling the operation of the electric motor 2 based on output signals from a rotation position sensor (not shown) for detecting a rotation position of the electric motor 2, the stroke detector 54 including the Hall sensor unit 71 for detecting the stroke amount of the input plunger 29, the input rod 30, and the input piston 26 based on the operation amount of the brake pedal 6 is provided. This controller 55 is capable of being appropriately connected to an onboard controller for carrying out various pieces of brake control such as regenerative cooperation control, brake assist control, and automatic brake control.

Next, an operation of the electric booster 1 during current supply is described.

When the brake pedal 6 is operated so as to move forward the input rod 30, the controller 55 controls the operation of the electric motor 2 based on the operation amount of the brake pedal 6, namely the stroke amount of the input plunger 29, the input rod 30, and the input piston 26 detected by the stroke detector 54. The nut member 39 of the ball screw mechanism 38 is rotationally driven by the electric motor 2 through intermediation of the pulleys 45A and 45B and the belt 46, to thereby move the threaded shaft 40 forward. Then, the spring seat 35 of the primary piston 10 is pushed by the step part 44 of the threaded shaft 40, and the primary piston 10 thus moves forward, thereby following the stroke of the input plunger 29, the input rod 30, and the input piston 26. As a result, the hydraulic pressure is generated in the primary chamber 12, and the hydraulic pressure is also transmitted to the secondary chamber 13 through the secondary piston 11. In this way, the brake hydraulic pressure generated in the master cylinder 4 is supplied to the wheel cylinders 67 of the respective wheels, thereby generating the braking force through friction braking.

When the operation of the brake pedal 6 is released, the controller 55 reversely rotates the electric motor 2 based on the stroke amount of the input plunger 29, the input rod 30, and the input piston 26, and the primary piston 10 and the secondary piston 11 consequently move backward. Thus, the brake hydraulic pressures in the master cylinder 4 are depressurized, and the braking force is released.

When the hydraulic pressures are generated, the hydraulic pressure in the primary chamber 12 is received by the smaller diameter part 26A of the input piston 26, and a reaction force thereof is transmitted to the brake pedal 6 through the input plunger 29 and the input rod 30. As a result, a desired braking force can be generated at a predetermined boost ratio (a ratio of a hydraulic pressure output to an operation force of the brake pedal 6). Then, through control of the operation of the electric motor 2, the controller 55 is capable of adjusting a relative position between the input piston 26 and the input plunger 29, and the primary piston 10 following the input piston 26 and the input plunger 29. Specifically, the position of the primary piston 10 can be adjusted forward, in other words, toward the master cylinder 4 side with respect to the stroke position of the input piston 26, thereby increasing the hydraulic pressure output with respect to the operation of the brake pedal 6, and the position of the primary piston 10 can be adjusted backward, in other words, toward the brake pedal 6 side, thereby decreasing the hydraulic pressure output with respect to the operation of the brake pedal 6. At this time, fluctuation of the reaction force to the brake pedal 6 caused by fluctuation of the hydraulic pressure output can be suppressed through actions of the first spring 34 and the second spring 36. As a result, brake control such as boost control, the brake assist control, inter-vehicle distance control, and the regeneration cooperation control can be carried out.

As described above, in the electric booster 1 according to this embodiment, the input member configured to move in the axial direction in accordance with the operation of the brake pedal 6 includes the input rod 30 that has the base end side coupled to the brake pedal 6 and is formed of the magnetic material, the input plunger 29 that has the base end side positioned on the distal end side of the input rod 30 and is formed of the non-magnetic material, and the input piston 26 that has the base end side positioned on the distal end side of the input plunger 29 and is formed of the magnetic material. The stroke detector 54 includes the first and second magnet members 70A and 70B fixed to the input plunger 29 and arranged so that the magnetic poles are aligned with the movement direction of the input plunger 29, and the Hall sensor unit 71 that is fixed to the housing 3, and detects the movement position of the input rod 30 including the input plunger 29, and the input piston 26 in accordance with the magnetic flux density from the first and second magnet members 70A and 70B.

As a result, the flat distribution having the large region along the axial direction can be provided as the magnetic flux distribution from the first and second magnet members 70A and 70B. As a result, even when the threaded shaft 40 formed of the magnetic material is arranged on the radially outside of the first and second magnet members 70A and 70B, the influence of the threaded shaft 40 received by the magnetic field can be decreased, and the stroke amount (movement position) of the input plunger 29, the input rod 30, and the input piston 26 can thus be relatively precisely detected in the wide range along the axial direction.

In the electric booster 1 according to this embodiment, both the input rod 30 and the input piston 26 are formed of the magnetic materials, but any one of them may be formed of a magnetic material, and the other one of them may be formed of a non-magnetic material.

Moreover, the stroke detector 54 is employed in the electric booster 1 according to this embodiment, but the stroke detector 54 may be independently employed as a device configured to detect the movement position of the movement member including the first member, the second member, and the third member. The first member is formed of a non-magnetic material and corresponds to the input plunger 29. The second member and the third member are positioned on both end sides along a movement direction of the first member and correspond to the input rod 30 and the input piston 26 which are formed of magnetic materials.

The embodiment of the present invention is described above, but it is readily understood by a person skilled in the art that various changes and improvements can be made to the exemplified embodiment without practically departing from the novel teachings and advantages of the present invention. Thus, forms to which such changes and improvements are made are also intended to be included in the technical scope of the present invention. The above-mentioned embodiment may be arbitrarily combined.

Further, the embodiment of the present invention described above is intended for easy understanding of the present invention, and does not limit the present invention. It is apparent that the present invention can be changed and modified without departing from the spirit thereof and encompasses equivalents thereof. Further, within a range in which the above-mentioned problems can be at least partially solved or within a range in which the effects are at least partially obtained, a suitable combination or omission of the components recited in the claims and described in the specification is possible.

The present application claims a priority to Japanese Patent Application No. 2015-110821 filed on May 29, 2015. All disclosed contents including the specification, the claims, the drawings, and the abstract of Japanese Patent Application No. 2015-110821 filed on May 29, 2015 are incorporated herein by reference in their entirety.

All disclosed contents including the specification, the claims, the drawings, and the abstract of Japanese Patent Application Laid-open No. 2015-21745 (Patent Literature 1) are incorporated herein by reference in their entirety.

REFERENCE SIGNS LIST

1 electric booster
2 electric motor 3 housing
4 master cylinder
10 primary piston
11 secondary piston
26 input piston (input member, second or third member of movement member)
29 input plunger (magnet holding member of input member, first member of movement member)
30 input rod (input member, second or third member of movement member)
38 ball screw mechanism (assist mechanism)
54 stroke detector
70A first magnet member
70B second magnet member
71 Hall sensor unit (magnetic flux density detection means)
75 Hall IC chip

The invention claimed is:

1. A stroke detector configured to detect a movement position of a movement member including a first member configured to linearly move, and a second member and a third member positioned on both end sides of the first member along a movement direction of the first member, at least one of the second member and the third member being formed of a magnetic material, the stroke detector comprising:
 a magnet member provided in the first member, and arranged so that magnetic poles are aligned in a movement direction of the movement member,
 the magnet member comprising a first magnet and a second magnet, which are spaced apart from each other in an axial direction of the first member, the first magnet being located at a position closest to one side of the first member in the axial direction, and the second magnet being located at a position closest to another side of the first member in the axial direction; and
 a magnetic flux density detection unit configured to detect the movement position of the movement member in accordance with a magnetic flux density from the magnet member.

2. An electric booster comprising the stroke detector according to claim 1, the electric booster comprising:
 a housing configured to accommodate an assist mechanism for propelling a piston of a master cylinder through an operation of an electric motor;
 the first, second and third input members being configured to move in an axial direction in accordance with an operation of a brake pedal; and
 the stroke detector being configured to detect movement positions of the first, second and third input members,
 wherein:
 the third input member is an input rod including a base end side coupled to the brake pedal;
 the second input member is a magnet holding member including a base end side positioned on the distal end of the input rod; and
 the first input member is an input piston including a base end side positioned on a distal end side of the magnet holding member, member.

* * * * *